United States Patent
Tischer (10) Patent No.: US 7,949,669 B2
(45) Date of Patent: May 24, 2011

(54) METHODS, SYSTEMS, AND COMPUTER READABLE MEDIA FOR SELF-TARGETED CONTENT DELIVERY

(75) Inventor: Steven Neil Tischer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 338 days.

(21) Appl. No.: 11/964,101

(22) Filed: Dec. 26, 2007

(65) Prior Publication Data
US 2009/0171985 A1 Jul. 2, 2009

(51) Int. Cl.
*G06F 7/00* (2006.01)

(52) U.S. Cl. .......................................... 707/758

(58) Field of Classification Search .................. None
See application file for complete search history.

(56) References Cited

U.S. PATENT DOCUMENTS

2008/0250023 A1* 10/2008 Baker et al. .................... 707/100
2009/0112693 A1* 4/2009 Jung et al. ........................ 705/10

* cited by examiner

*Primary Examiner* — Pierre M Vital
*Assistant Examiner* — Truong V Vo
(74) *Attorney, Agent, or Firm* — Hope Baldauff Hartman, LLC (57) ABSTRACT

Systems, methods, and computer-readable storage media are provided for self-targeted content delivery are provided. Content objects can be delivered to a user and indications from the user to mark any content object can be received thereby generating standard data structures to be placed into a central data store. At a later time, on various other systems, a content guide may be provided to the user showing the content related to the standard data structures placed in the central store. The user may mark digital content as it is encountered via television, internet, mobile devices, automobile terminals, public terminals, kiosks, or otherwise. Standardized data structures can allow the marking to operate across platforms, operating systems, hardware, and delivery modes. Content guides created from data structures associated with marked content can allow the marked content to be recalled and accessed from any of various other systems at a later time.

20 Claims, 5 Drawing Sheets

METHODS, SYSTEMS, AND COMPUTER READABLE MEDIA FOR SELF-TARGETED CONTENT DELIVERY

BACKGROUND

This application relates generally to the field of digital content delivery. More specifically, this application relates to systems and methods for allowing a user to self-target digital content to a variety of operating environments.

Digital content delivery systems are becoming more pervasive. For example, digital television, internet, mobile data services, digital satellite services, digital video recording, and digital music stores are common fixtures of modern life. Set top boxes on television sets are used to receive television programming, movies, music, video on demand, data services, news, weather, and more. Similar content is available on mobile devices, such as cellular telephones. Computers, navigation terminals in automobiles, and various other kiosks and terminals encountered by users in various locations are delivering media and informational content. Generally, these systems may be supplied by various different content providers, and may use various different software platforms or operating systems.

If a user encounters a specific piece of content that he or she wishes to explore further at a later time or possibly via a different mode of delivery, there is no generalized mechanism for maintaining a note or bookmark about the content across systems, platforms, and locations. Furthermore, there is also no universal electronic mechanism for bookmarking or flagging a physical object in the environment.

SUMMARY

Systems, methods, and computer-readable storage media for providing self-targeted content delivery are disclosed. Exemplary embodiments of a computer-implemented method for self-targeted content delivery can include providing content objects to a user, receiving an indication from the user to mark a content object, generating standard data structures related to content objects being marked, placing the standard data structures into a central data store, and providing a content guide to the user showing the content related to the standard data structures placed in the central store. These methods can allow a user to mark digital content as it is encountered on the television, internet, mobile devices, automobile terminals, public terminals, kiosks or otherwise. Standardized data structures can allow the marking to operate across platforms, operating systems, hardware, and delivery modes. Content guides created from the data structures associated with marked content can allow the content that has been marked to be accessed from anywhere, and at any time.

According to another embodiment, physical objects in the environment can be marked. For example, the barcode of a product in a store can be captured by a mobile device and at a later time, the content guide at the user's television or PC may provide them with various details and additional information related to the product that they marked in the store.

Other systems, methods, and/or computer-readable storage media according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for providing self-targeted content delivery. In the following detailed description, references are made to the accompanying drawings that form a part hereof, and which are shown by way of exemplary embodiments and implementations.

Figure 1:
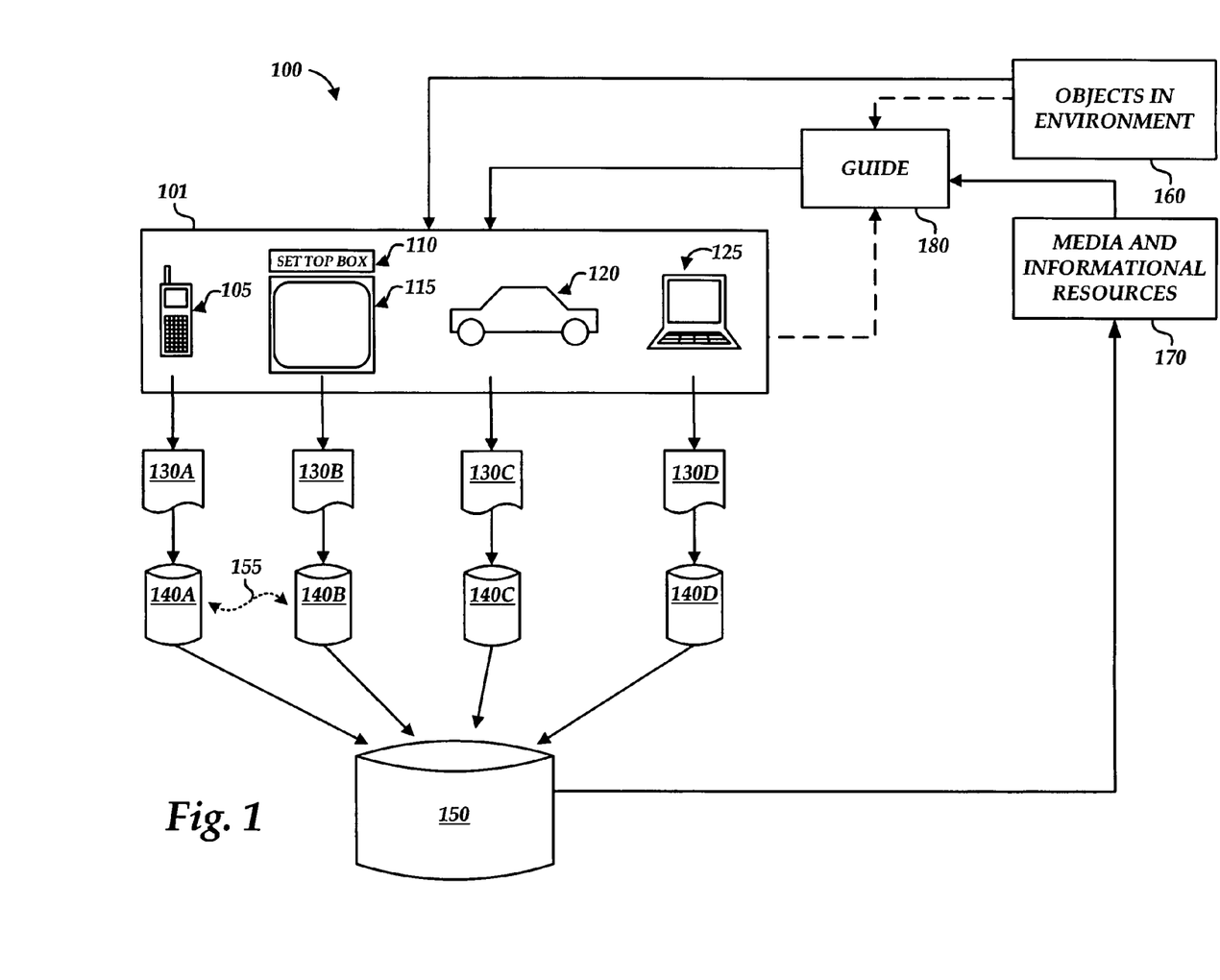
FIG. 1 is a block diagram illustrating an information and media delivery system in accordance with exemplary embodiments.

Turning now to FIG. 1, the figure is a block diagram illustrating an information and media delivery system 100 in accordance with exemplary embodiments. A user touch point 101 can be operated by a user to consume and interact with a content object. The content object may be any media, information, or any attribute thereof. A user may also mark a content object via the user touch point 101. Marking may involve flagging, noting, requesting, or otherwise specifying the content object. Some examples of content objects are discussed in more detail with respect to FIG. 2.

An example of the user touch point 101 is a mobile device 105, such as a mobile phone, smart phone, PDA, navigator, laptop computer, palmtop computer, wireless terminal, handheld computer system, or portable computer system. Another example of the user touch point 101 is a television 115 that may operate in conjunction with a set top box 110. Another example of the user touch point 101 is an automobile 120 or, more specifically, an information system, navigator, or mobile computer within the automobile 120. Another example of the user touch point 101 is a computer 125. The computer 125 may also be a terminal, browser, client, or thin client. It should be appreciated that various other systems where a user can consume and/or interact with information or media may operate as the user touch points 101, such as kiosks, point of sale systems, ticketing terminals, vending terminals, information terminals, in-seat airline systems, advertisements, product displays, media audition stations, and various other such systems.

A standardized data structure 130A-130D may be instantiated and populated in response to a user marking a content object from a user touch point 101. The standardized data structure 130A-130D may be created within the local memory of the user touch point 101. The standardized data structure 130A-130D may be populated with information related to the content object being marked. Such information may include identification of the object, media type of the object, location of the object, time of marking, informational classification of the object, and various other data elements. This information may come from the content object itself, be created on the fly by the user touch point 101, or some combination of both. The standardized structure and format of the standardized data structure 130A-130D may provide for a level of universality whereby content objects marked at different types of the user touch points 101 can be interoperable or used interchangeably.

The structure of a standardized data structure 130A-130D may be provided for a specific type of media or data source. For example, one standardized data structure 130A-130D may be used for storing information about movies whole another may be used to store information about books. The standardized data structure 130A-130D may also be custom defined by a user to meet their specific needs. Such user defined aspects of the standardized data structure 130A-130D may be specified to automatically ripple though all standardized data structures 130A-130D related to that user. In addition to being custom defined by a user, standardized data structures 130A-130D may be modified by a user from one that was provided. For example, a user may want to add a field for recording a "business or personal" category within all of their standardized data structures 130A-130D. The user could add the field to one of their standardized data structures 130A-130D and then select the field to be rippled into their other standardized data structures 130A-130D.

The standardized data structure 130A-130D may be initially created within the local memory of the user touch point 101 that is being used to mark the content object associated with the standardized data structure 130A-130D. The standardized data structure 130A-130D may be stored to a local data store 140A-140D within the user touch point 101. The standardized data structures 130A-130D from the various local data stores 140A-140D can be aggregated into a central data store 150. While the central data store 150 may be considered a centralized data store, the central data store 150 may also be distributed, or mirrored, over a collection of co-located, or remotely located, storage systems or databases. The aggregation can occur asynchronously or synchronously.

The standardized data structures 130A-130D that have been aggregated into the central data store 150 may be used at a later time to specify content objects for delivery to the user at the user touch point 101. The content object may be sourced from various storage pools of media and/or informational resources 170, such as web servers, databases, video on demand servers, music servers, news feeds, blog feeds, online stores or any other such stores of content. The user may be presented with a content guide 180 at the user touch point 101. The guide 180 presented to a user may be a content list of media objects that were previously marked by the user and thus have standardized data structures 130A-130D that have been aggregated into the central data store 150. The content guide 180 may be structured to best suit the type of user interface in a given user touch point 101 device. For example, the guide 180 may be scaled down to fit the display resolution of the mobile device 105 type user touch point 101.

The content guide 180 can be considered analogous to a bookmark list, a favorites list, or a media consumption "to do" list where the list of items in the guide 180 is constructed all, or in part, by marking actions taken by the user at the user touch point 101. A user may operate the user touch point 101 to mark a content object and then view, browse, audition, or otherwise consume the content object (or other related content objects) at a later time. This content consumption at a later time may be achieved by selecting the content from the guide 180 that is created from the standardized data structures 130A-130D that have been aggregated in response to being marked by the user. The user may mark a content object at one type of user touch point 101 and then later view the content object from a different type of user touch point 101. The user touch point 101 device may be aware of its user or of multiple users. For example, the set top box 110 in a home may be accessible by someone visiting the home to allow the visitor to access their guide 180. Also, content objects marked by the visitor can then be aggregated in relation to the visitor and not to the normal owner of the set top box 110. This will allow the visitor to access any tagged content objects at a later time from the guide 180 associated with the visitor, even at another location, such as the set top box 110 back at the visitor's own home. The visiting user accessing someone else's user touch point 101 may need to login to the user touch point 101 or otherwise provide identifying information.

In addition to the standardized data structures 130A-130D being aggregated into the central data store 150, the standardized data structures 130A-130D may be distributed from one user touch point 101 to another in a peer-to-peer fashion. For example, a peer-to-peer transfer 155 may transmit a standardized data structure 130A from the local data store 140A associated with a mobile device 105 to the local data store 140B associated with a set top box 110. The peer-to-peer transfer 155 can allow the standardized data structure 130A that was generated in response to marking an object on the mobile device 105 to directly affect content retrieval at the set top box 110 without (or in addition to) centralized aggregation. For example, a movie object marked by a user's mobile phone can be peer-to-peer transferred 155 directly to a set top box 110 to provide retrieval of reviews, trailers, or showing times on the television.

Physical environment objects 160 may interact with the user touch points 101 to allow object markings that will relate to content objects associated to the physical environment object 160. For example, while shopping at a store, a user may encounter a book, DVD, or other product that the user is interested in and use the mobile device 105, point of sale terminal, or kiosk type of user touch point 101 to mark the product. This marking will create a standardized data structure, such as the standardized data structure 130A, that will be centrally aggregated in relation to the user. The user may later be presented with a content guide, such as the content guide 180, presenting information related to the product of interest from the store. For example, if the product was a DVD, and the user marked the DVD using a mobile device 105 such as a cell phone, the user guide 180 may present the user with reviews and/or movie trailers related to the DVD later that day at the user's PC 125 or television 115.

Figure 2:
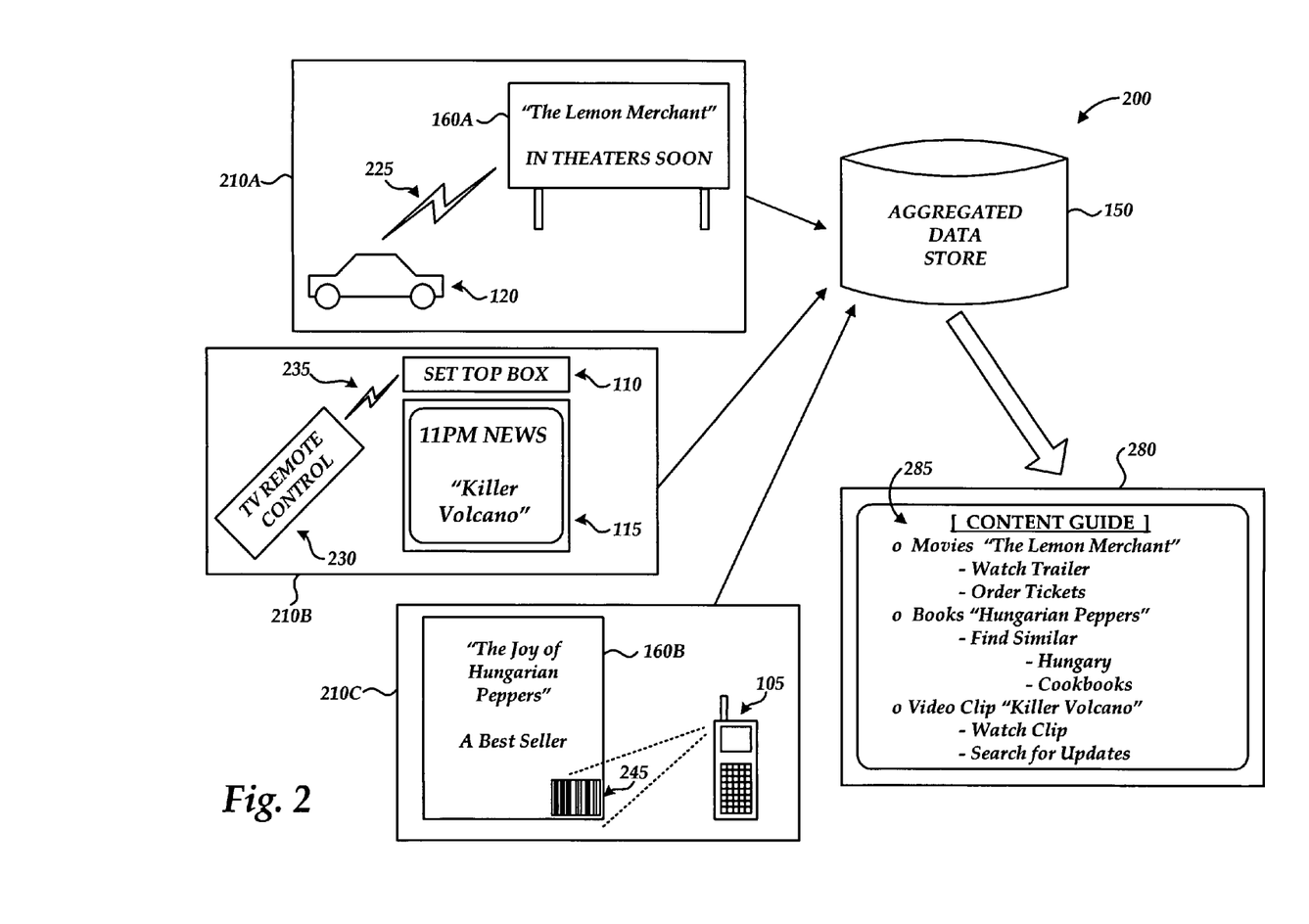
FIG. 2 is a block diagram illustrating three examples of collecting and aggregating self-targeted consumer data in accordance with exemplary embodiments.

Turning now to FIG. 2, the figure is a block diagram illustrating three examples of collecting and aggregating self-targeted consumer data in accordance with exemplary embodiments. Three examples of content marking scenarios 210A-210C performed by a user can generate standardized data structures, such as the standardized data structures 130A-130D, that can be aggregated into the central data store 150. At a later time, the standardized data structures 130A-130D can be incorporated into a content guide 285 that may be presented to the user on a user's television display 280.

In the first content marking scenario 210A, a user operating the user touch point 101 within the automobile 120 may drive past a road side sign 160A advertising a movie. The road side sign 160A is an example of a physical environment object, such as the object 160. The road side sign 160A can exchange information with the user touch point 101 within the user's automobile 120 over a wireless data link 225. The wireless data link 225 can be radio frequency, or optical using any protocol or modulation scheme, such as Wi-Fi, Wi-Max, frequency modulation, amplitude modulation, optical on-off keying, infrared, Bluetooth, or otherwise. Once the user touch point 101 within the user's automobile 120 is aware of the road side sign 160A, the user can use the user touch point 101 to mark content information associated with the movie advertised on the road side sign 160A.

In the second content marking scenario 210B, a user watching a television news program on the television 115 may operate the set top box 110 as the user touch point 101 to mark the content of the news program. This marking may be performed by pressing a button on a television remote control 230 that communicates with the set top box 110 or television 115 using a wireless data link 235, such as radio, infrared, or otherwise. In this example the user may mark content related to the news event being reported on the television news program.

In the third content marking scenario 210C, a user shopping in a bookstore may employ a camera feature on the mobile phone 105 to scan a barcode 245 of a book 160B that the user is interested in. Here, the mobile phone 105 is the user touch point 101 and the book 160B is an example of a physical environment object, such as the object 160.

Each of the three content marking scenarios 210A-210C can generate a standardized data structure, such as the data structures 130A-130D, that can be aggregated into the central data store 150. At a later time, the standardized data structures 130A-130D from the three content marking scenarios 210A-210C can provide information to be incorporated into the content guide 285. When the content guide 285 is presented to the user on the user's television display 280, information related to the marked content objects is available. For example, the user may watch a trailer for the movie that was advertised on the road side sign 160A. The user may also order tickets for the movie. The user may also find information about the book that was scanned in the third content marking scenario 210C. The information about the book may include links for purchasing the book online, links for finding similar books, or immediate information about the topic of the book, the author, or any other attributes associated with any of the marked content objects. Information collected by a user may optionally be shared with other users, and information shared from various other users may be gathered together by a user.

Figure 3:
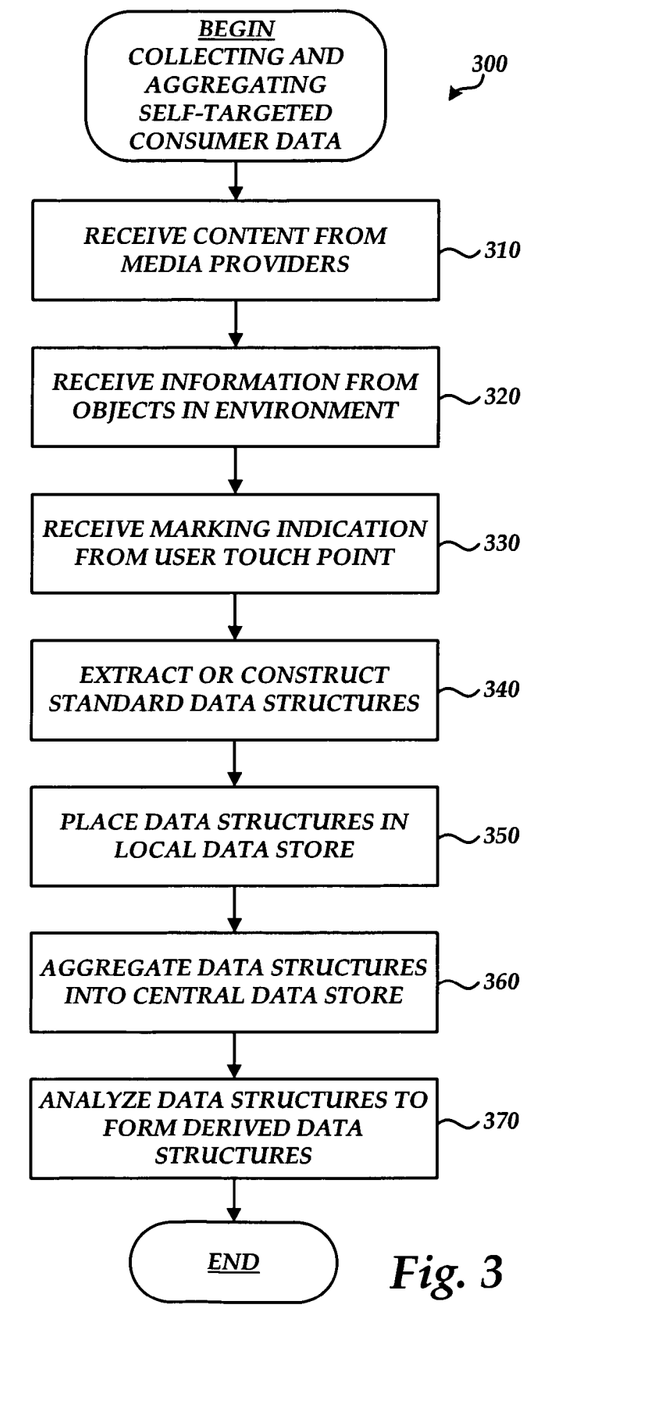
FIG. 3 is a flow chart illustrating a routine for collecting and aggregating self-targeted consumer data in accordance with exemplary embodiments.

FIG. 3 is a flow chart illustrating a routine 300 for collecting and aggregating self-targeted consumer data in accordance with exemplary embodiments. Note that methods depicted in the exemplary flow charts described herein may be modified to include fewer, additional, and/or different steps within the scope of this disclosure. Furthermore, steps depicted in the flow charts may be performed out of the order shown including substantially concurrently, in reverse order, in a substantially different order, sequentially, in parallel, or in some combination thereof.

Beginning with operation 310, the routine 300 can receive content from media providers. For example, the content may be video programming, news, sports, movies, songs, internet data, advertising materials, games, programs, electronic books, or any other such media or informational content. The user may browse, watch, audition, or otherwise consume this content at the user touch point 101.

In operation 320, the user touch point 101 can receive information from objects in the environment also known as the physical environment objects 160. Examples of the physical environment objects 160 may be signs, bar coded projects, kiosks, displays, or any object or presentation that can provide information to the user touch point 101 for marking. This information may be provided to the user touch point 101 by optical scanning, wireless communications, optical communications, radio signal, manual input, or otherwise.

In operation 330, the user can interact with the user touch point 101 to supply a marking indication. For example, a user operating the PC 125 type user touch point 101 may select content objects on the PC 125 using keystrokes, mouse clicks, or a combination there of. A user operating the mobile device 105 for the user touch point 101 may mark content being viewed or browsed on the display of the mobile device 105 by pressing a button on the mobile device 105 or issuing a voice command or operating a touch screen. A user in an automobile, such as the automobile 120, may mark a content object by pressing a button on a terminal in the automobile 120 or issuing a voice command to the terminal within the automobile 120. The marking may be of content from media providers as received in operation 310, of information received from physical environment objects 160 as acquired in operation 320, or any other content object.

In operation 340, the standardized data structures 130A-130D related to the content object being marked are established. The standardized data structures 130A-130D may be provided along with the content object for example as metadata, ID3 tags, MPEG-4 information, or other included information related to the object. The standardized data structures 130A-130D may also be constructed after the marking request is made. For example, information related to when, where, and by whom the marking is being made may be provided at the time of marking. Links to related data may be added after the marking. The standardized data structures 130A-130D may contain information about the content object itself and also about the marking of the content object such as where and when the marking was make. Other contextual information may be included within the standardized data structures 130A-130D. Information may be organized as hierarchical, categorized, associative, flat lists, or any other structure or combination thereof.

In operation 350, the standardized data structures 130A-130D may be placed in a local data store, such as the local data stores 140A-140D. Operation 350 may occur within the user touch point 101. In operation 360, the routine 300 can aggregate the standardized data structures 130A-130D from one or more local data stores 140A-140D into the central data store 150. The aggregation can occur either immediately after marking, or at some later time. The aggregation can be a push process originating from the user touch point 101 or a pull/polling process originating at a computing device or server associated with the central data store 150.

In operation 370, the standardized data structures 130A-130D that were aggregated in operation 360 may be analyzed to derive additional standardized data structures 130A-130D that indicate additional marked content objects. This analysis may be performed by a computing device or server associated with the central data store 150. This analysis may also be performed by the user touch point 101 or the computing device associated with generating the content guide 180. For example, if a movie poster or sign for a movie was marked, an analysis may yield that the content relates to a movie. This movie relationship may trigger an addition of the standardized data structures 130A-130D for video clips of movie trailers. Furthermore, standardized data structures 130A-130D for Internet links to online reviews or to a ticket box office may be added to the central data store 150 records associated with the user. Routine 300 may terminate after operation 370.

Figure 4:
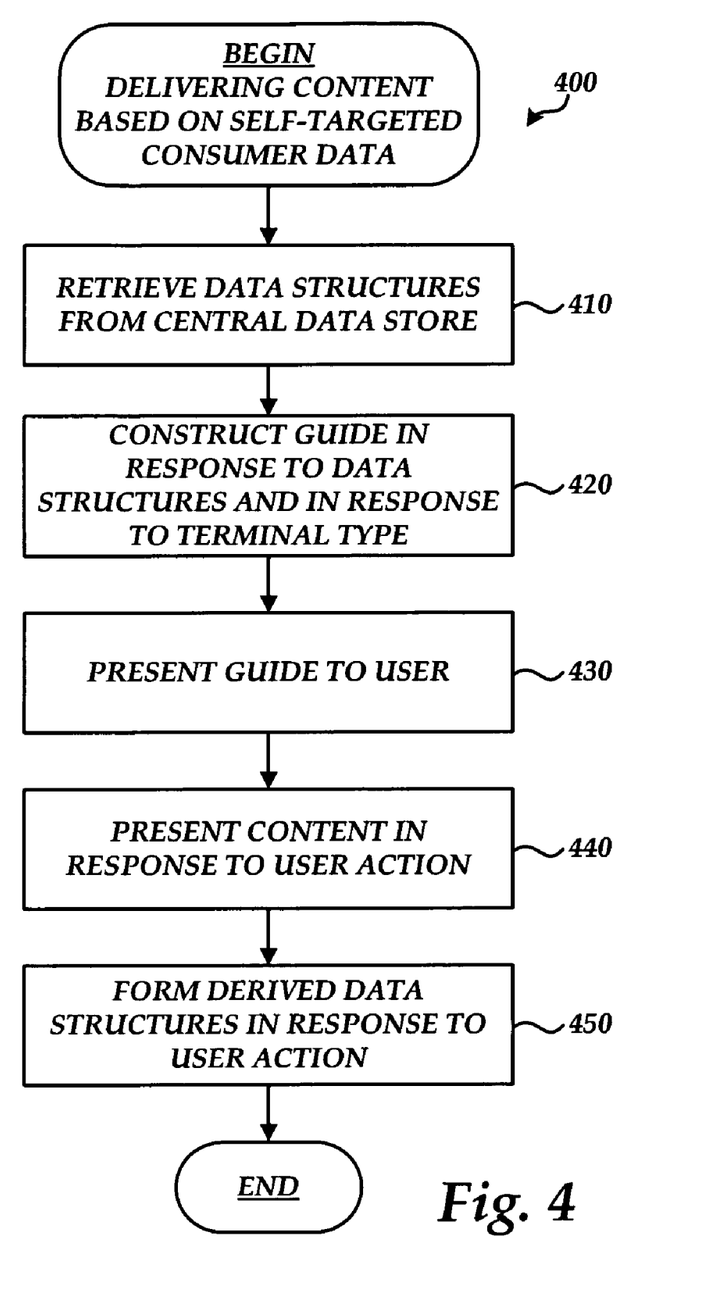
FIG. 4 is a flow chart illustrating a routine for delivering content based on self-targeted consumer data in accordance with exemplary embodiments.

FIG. 4 is a flow chart illustrating a routine 400 for delivering content based on self-targeted consumer data in accordance with exemplary embodiments. In operation 410, standardized data structures 130A-130D that were aggregated into the central data store 150 may be retrieved by a computing device responsible for generating the content guide 180.

In operation 420, a content guide, such as the content guide 180, can be constructed. The content guide 180 can contain information related to the standardized data structures 130A-130D that were retrieved in operation 410. Additionally, the content guide 180 can be formatted in response to the type of terminal or the user touch point 101 being used. For example, the content guide 180 for the television 115 or PC 125 may be richer and more complete than the content guide 180 targeted to the mobile device 105.

In operation 430, the content guide 180 is presented to the user on the user touch point 101. The user may interact with the presented content guide 180 in order to select content objects to be viewed, browsed, auditioned, or otherwise consumed. The user may also sort, or otherwise organize, the content guide 180 by media type, were the content objects were marked, when the content objects were marked, the type of user touch point 101 or terminal upon which the content objects were marked, or based on any related attributes such as author, date, publisher, length, resolution, sapling rate, or any other attributes of the content.

In operation 440, content from the content guide 180 that may be presented to the user for viewing, reading, browsing, auditioning, or otherwise consuming in response to the user acting upon the content guide 180. For example, if the user selects to view a movie clip, the content of the video clip can be streamed to the user at the user touch point 101 being operated by the user.

In operation 450, user actions may be analyzed to derive additional standardized data structures 130A-130D that indicate additional marked content objects. For example, if the user is selecting to listen to songs all by a particular recording artist, a new standardized data structure, such as the standardized data structure 130A, relating to that recording artist may be added to the central data store 150 records associated with the user. Additional information may be related to any attribute of the original data and may be obtained from dedicated databases or from various data searches such as Internet searches, or searches of stores, libraries, news archives, encyclopedias, or other catalogs of media or information content. Routine 400 may terminate after operation 450.

Figure 5:
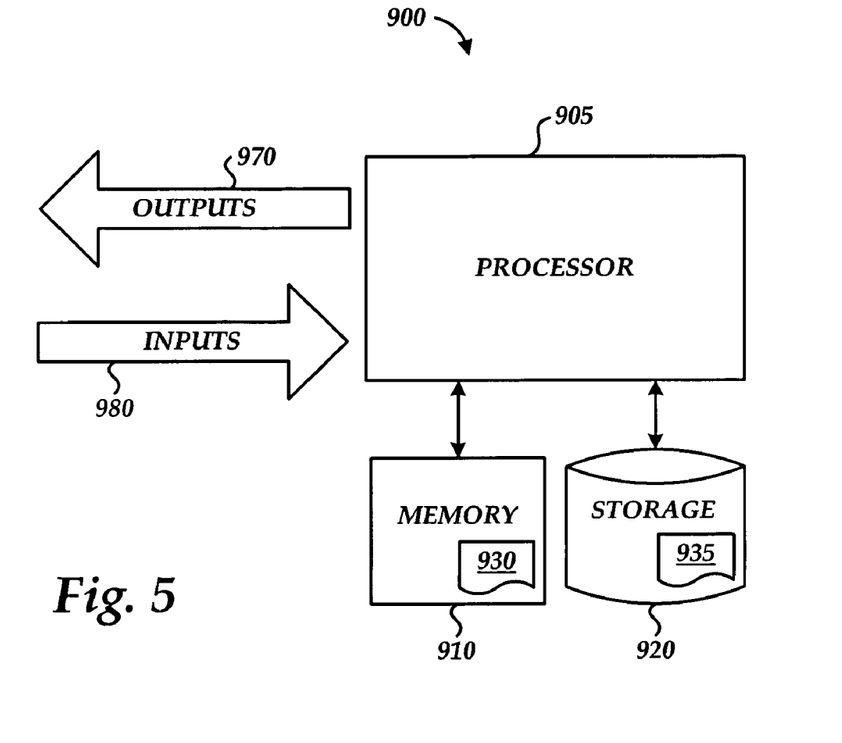
FIG. 5 is a block diagram illustrating a computing environment in accordance with exemplary embodiments.

Turning now to FIG. 5, the figure is a block diagram illustrating a computing environment 900, in accordance with exemplary embodiments. The computing environment 900 can include a processor 905, system memory 910, and storage 920. The computing environment 900 can represent the computing system at the user touch point 101, the central data store 150, a generator of the content guide 180, a server or generator of the media resources 170, or any combination thereof. It should be appreciated that the routines described herein may be implemented across any number of different computing environment instances that may operate together to provide self-targeted consumer content delivery.

The processor 905 may be a microprocessor, microcontroller, digital signal processor (DSP), application specific integrated circuit (ASIC), field programmable gate array (FPGA), system on chip (SOC), processing core, multi-processor array, dedicated digital circuitry, or any other form of logical processing device. The storage 920 may be a mass storage device, a read only memory (ROM), programmable read only memory (PROM), erasable programmable read only memory (EPROM), FLASH memory, optical storage, magnetic storage, semiconductor storage, CD-ROM, digital versatile disks (DVD), HD-DVD, BLU-RAY, magnetic cassettes, magnetic tape, magnetic disk storage, or any other medium which can be used to store information and which can be accessed by the processor 905. In other words, the storage 920 may be any computer-readable medium. Such computer-readable medium may be used for storing an operating system or any other program modules, computer-readable instructions, data structures, program modules or other data.

The system memory 910 can be random access memory (RAM) or any other memory used during the operation of the processor 905. The system memory 910 may be used for storing data or programs, or program modules, or computer-readable instructions. The system memory 910 may be another example of a computer-readable medium. A computer program or program module 935 may be executed from the storage device 920. For example, the program or module 935 may be loaded, or booted, into memory 910 as a program or module 930. For example programs or modules 930, 935 may operate to perform the methods of FIG. 3 and FIG. 4 as described herein. The programs or modules 930, 935 may reside and execute in whole, or in part, on the user touch point 101, the central data store 150, the generator of the content guide 180, a server for media resources 170, or any other computing devices within the information delivery system 100, 200. The programs or modules 930, 935 may reside and execute in a distributed fashion over various computing devices within the information delivery system 100, 200.

Outputs 970 associated with the processor 905 may include video displays, audio speakers, network interfaces, projectors, printers, illuminated indicators, buzzers, voice synthesizers, transmitters, or any other device used to output information, data, or signals from the processor 905 to any other entity such as a user, a network, a system bus, another processor 905, a storage system, another computing environment 900, or otherwise. Inputs 980 associated with the processor 905 may include keyboards, mice, cameras, video scanners, sheet scanners, barcode readers, card readers, radio receivers, infrared receivers, microphones, buttons, control knobs, potentiometers, joysticks, trackballs, receivers, or any other device used to input information, data, or signals to the processor 905 from any other entity such as a user, a network, a system bus, another processor 905, a storage system, another computing environment 900, or otherwise.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims. Various modifications and changes may be made to the subject matter described herein without following the example embodiments and applications illustrated and described, and without departing from the true spirit and scope of the embodiments, which is set forth in the following claims.

What is claimed is:

1. A computer-implemented method for self-targeted content delivery, comprising:
   receiving a first indication from a first user to mark a first content object and a second indication from the first user to mark a second content object;
   in response to the first content object and the second content being marked:
      determining that the first content object is a first media type and that the second content object is a second media type, wherein the first media type and the second media type are different,
      in response to determining that the first content object is a first media type, creating a first standard data structure populated with first information related to the first content object, the first information comprising a media type of the content object, a location of the content object, and an informational classification of the content object, and in response to determining that the second content object is a second media type, creating a second standard data structure populated with second information related to the second content object;

placing the first standard data structure into a first data store and the second standard data structure into a second data store;

providing a content guide to the first user comprising a first item associated with the first information related to the first content object and a second item associated with the second information related to the second content object;

receiving a selection of the first item; and in response to receiving the selection, providing the first information related to the first content object.

2. The method of claim 1, wherein placing the first standard data structure into the first data store and the second standard data structure into a second data store comprises:

placing the first standard data structure into a first local data store and the second standard data structure into a second local data store; and aggregating the first standard data structure from the first local data store with the second standard data structure from the second local data store into a central data store.

3. The method of claim 1, further comprising analyzing the first standard data structure to form a derived data structure comprising third information about a third content object related to the first content object.

4. The method of claim 1, further comprising analyzing a user selection of the first item from the content guide to form a derived data structure comprising third information about a third content object related to the first content object.

5. The method of claim 1, wherein providing the content guide to the first user comprises formatting the content guide according to a parameter of a touch point being operated by the first user.

6. The method of claim 1, wherein the first content object is a physical object in the environment.

7. The method of claim 1, wherein placing the first standard data structure into the first data store comprises:

placing the first standard data structure into a first local data store associated with the first user; and sharing the first standard data structure to a third data store associated with a second user.

8. A computer-readable storage medium for self-targeted content delivery, comprising:

instructions that, when executed on a computer, cause the computer to:

receive a first indication from a first user to mark a first content object and a second indication from the first user to mark a second content object;

in response to the first content object and the second content object being marked:

determine that the first content object is a first media type and the second content object is a second media type, wherein the first media type and the second media type are different, in response to determining that the first content object is a first media type, create a first standard data structure populated with first information related to the first content object, the first information comprising a media type of the content object, a location of the content object, and an informational classification of the content object, and in response to determining that the second content object is a second media type, create a second standard data structure populated with second information related to the second content object;

place the first standard data structure into a first data store and the second standard data structure into a second data store;

provide a content guide to the first user comprising a first item associated with the first information related to the first content object and a second item associated with the second information related to the second content object;

receive a selection of the first item; and in response to receiving the selection, provide the first information related to the first content object.

9. The computer-readable storage medium of claim 8, wherein placing the first standard data structure into the first data store and the second standard data structure into the second data store comprises:

placing the first standard data structure into a first local data store and the second standard data structure into a second local data store; and aggregating the first standard data structure from the first local data store with the second standard data structure of the second local data store into a central data store.

10. The computer-readable storage medium of claim 8, comprising further instructions that, when executed on the computer, cause the computer to analyze the first standard data structure to form a derived data structure comprising third information about a third content object related to the first content object.

11. The computer-readable storage medium of claim 8, comprising further instructions that, when executed on the computer, cause the computer to analyze a user selection of the first item from the content guide to form a derived data structure comprising third information about a third content object related to the first content object.

12. The computer-readable storage medium of claim 8, wherein providing the content guide to the first user comprises formatting the content guide according to a parameter of a touch point being operated by the first user.

13. The computer-readable storage medium of claim 8, wherein placing the first standard data structure into a central data store comprises sharing the first standard data structure to a second user.

14. A system for providing self-targeted content delivery, comprising:

a processor; and memory coupled to the processor, the memory comprising instructions configured to enable the processor to:

receive a first indication from a first user to mark a first content object and a second indication from the first user to mark a second content object, in response to the first content object and the second content object being marked:

determine that the first content object is a first media type and the second content object is a second media type, wherein the first media type and the second media type are different, in response to determining that the first content object is a first media type, create a first standard data structure populated with first information related to the first content object, the first information comprising a media type of the content object, a location of the content object, and an informational classification of the content object, and in response to determining that the second content object is a second media type, create a second standard data structure populated with second information related to the second content object, place the first standard data structure into a first data store and the second standard data structure into a second data store, provide a content guide to the first user comprising a first item associated with the first information related to the first content object and a second item associated with the second information related to the second content object, receive a selection of the first item, and in response to receiving the selection, provide the first information related to the first content object.

15. The system of claim 14, wherein placing the first standard data structure into the first data store and the second standard data structure into the second data store comprises:

placing the first standard data structure into a first local data store and the second standard data structure into a second local data store; and aggregating the first standard data structure from the first local data store with the second standard data structure from the second local data stores into a central data store.

16. The system of claim 14, wherein the instructions are further configured to enable the processor to:

analyze the first standard data structure to form a derived data structure comprising third information about a third content object related to the first content object.

17. The system of claim 14, wherein the instructions are further configured to enable the processor to:

analyze a user selection of the first item from the content guide to form a derived data structure comprising third information about a third content object related to the first content object.

18. The system of claim 14, wherein providing the content guide to the first user comprises formatting the content guide according to a parameter of the system being operated by the first user.

19. The system of claim 14, wherein the first content object is a physical object in the environment.

20. The system of claim 14, wherein placing the first standard data structure into the first data store comprises sharing the first standard data structure to a second user.

* * * * *